US012590811B2

(12) United States Patent
Ko

(10) Patent No.: US 12,590,811 B2
(45) Date of Patent: Mar. 31, 2026

(54) METHOD, APPARATUS, AND PROGRAM FOR PROVIDING IMAGE-BASED DRIVING ASSISTANCE GUIDANCE IN WEARABLE HELMET

(71) Applicant: THINKWARE CORPORATION, Seongnam-si (KR)

(72) Inventor: Suk Pil Ko, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 182 days.

(21) Appl. No.: 18/229,234

(22) Filed: Aug. 2, 2023

(65) Prior Publication Data

US 2024/0044666 A1 Feb. 8, 2024

(30) Foreign Application Priority Data

Aug. 2, 2022 (KR) ........................ 10-2022-0096347
Aug. 1, 2023 (KR) ........................ 10-2023-0100721

(51) Int. Cl.
| | |
|---|---|
| *G01C 21/36* | (2006.01) |
| *A42B 3/04* | (2006.01) |
| *G01C 21/34* | (2006.01) |
| *G06T 11/00* | (2006.01) |
| *G06V 20/58* | (2022.01) |
| *H04N 5/262* | (2006.01) |

(52) U.S. Cl.
CPC .......... *G01C 21/3647* (2013.01); *A42B 3/042* (2013.01); *G01C 21/3461* (2013.01); *G06T 11/00* (2013.01); *G06V 20/58* (2022.01); *H04N 5/2628* (2013.01)

(58) Field of Classification Search
None
See application file for complete search history.

(56) References Cited

U.S. PATENT DOCUMENTS

| | | | |
|---|---|---|---|
| 2012/0224060 A1* | 9/2012 | Gurevich | G01C 21/365 348/148 |
| 2016/0037849 A1* | 2/2016 | Shearman | A61B 5/01 2/424 |
| 2017/0274827 A1* | 9/2017 | Lewis | G08G 1/167 |
| 2020/0015536 A1* | 1/2020 | Ciccaglione | A62B 18/08 |
| 2020/0304753 A1* | 9/2020 | Venkataraman | A61B 1/00045 |
| 2022/0101490 A1* | 3/2022 | Bruder | G06T 19/006 |

* cited by examiner

*Primary Examiner* — Kyle Zhai
(74) *Attorney, Agent, or Firm* — WHDA, LLP

(57) ABSTRACT

A method for providing an image-based driving assistance guidance in a wearable helmet includes determining whether guidance is required during a driving by a driver, acquiring a driving image of a moving object that the driver drives, generating guidance information for assisting the driving of the driver based on the driving image when it is determined that the guidance is required, and displaying the generated guidance information through the wearable helmet.

21 Claims, 12 Drawing Sheets

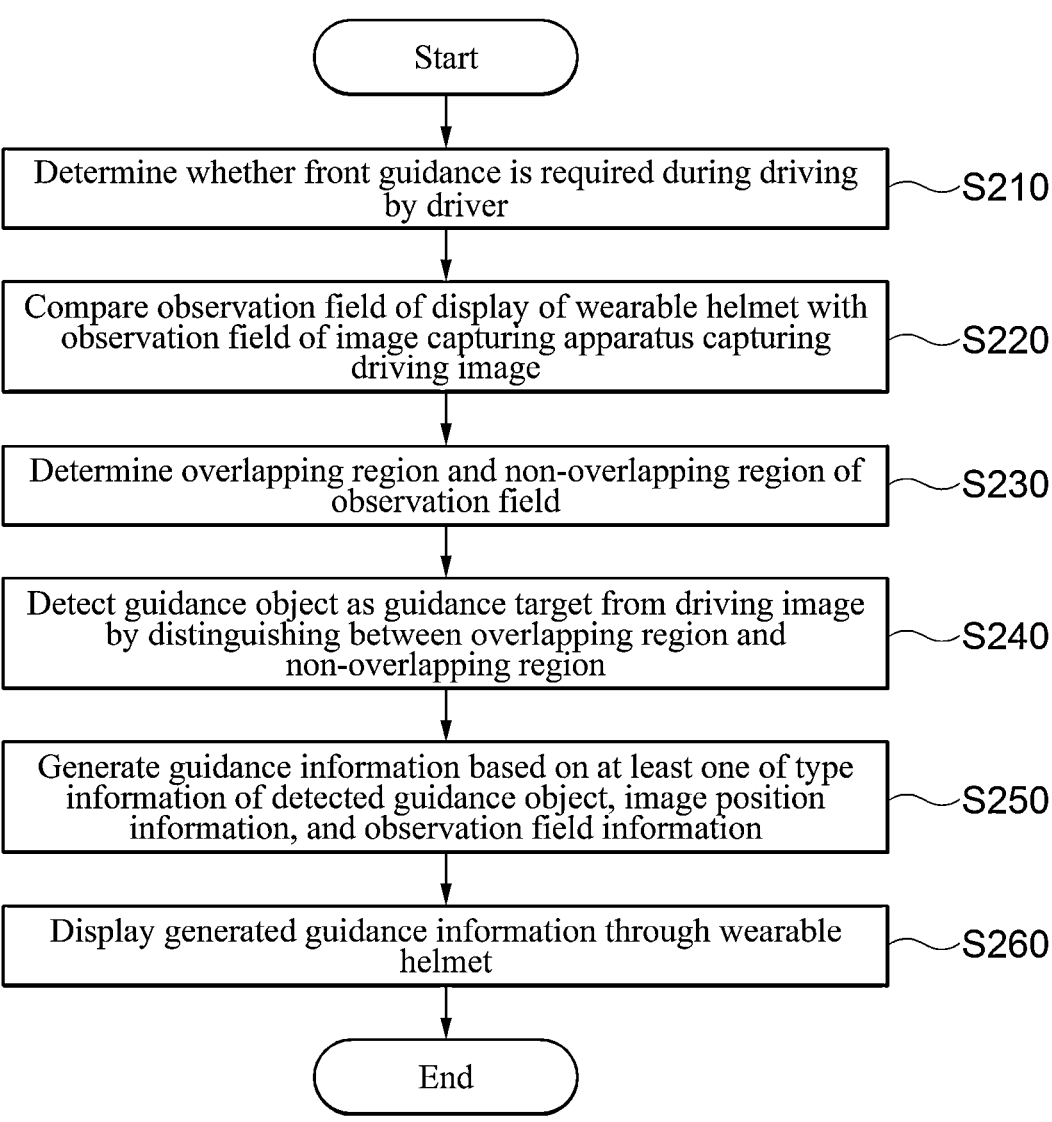

Start

Determine whether front guidance is required during driving by driver — S210

Compare observation field of display of wearable helmet with observation field of image capturing apparatus capturing driving image — S220

Determine overlapping region and non-overlapping region of observation field — S230

Detect guidance object as guidance target from driving image by distinguishing between overlapping region and non-overlapping region — S240

Generate guidance information based on at least one of type information of detected guidance object, image position information, and observation field information — S250

Display generated guidance information through wearable helmet — S260

End

FIG. 7

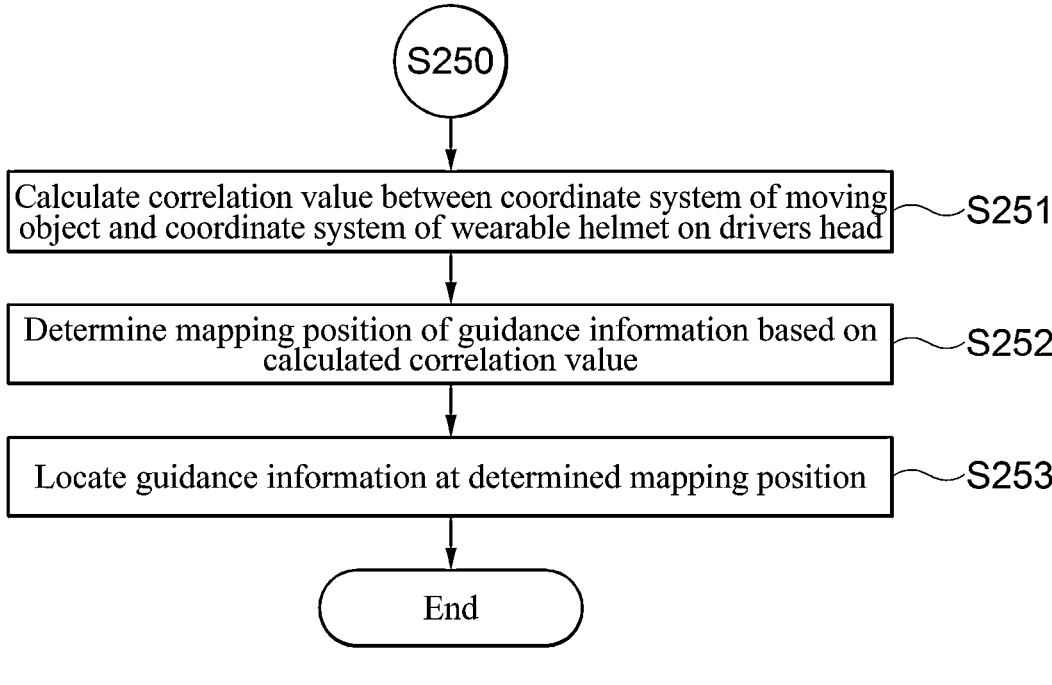

S250

Calculate correlation value between coordinate system of moving object and coordinate system of wearable helmet on drivers head — S251

Determine mapping position of guidance information based on calculated correlation value — S252

Locate guidance information at determined mapping position — S253

End

FIG. 8

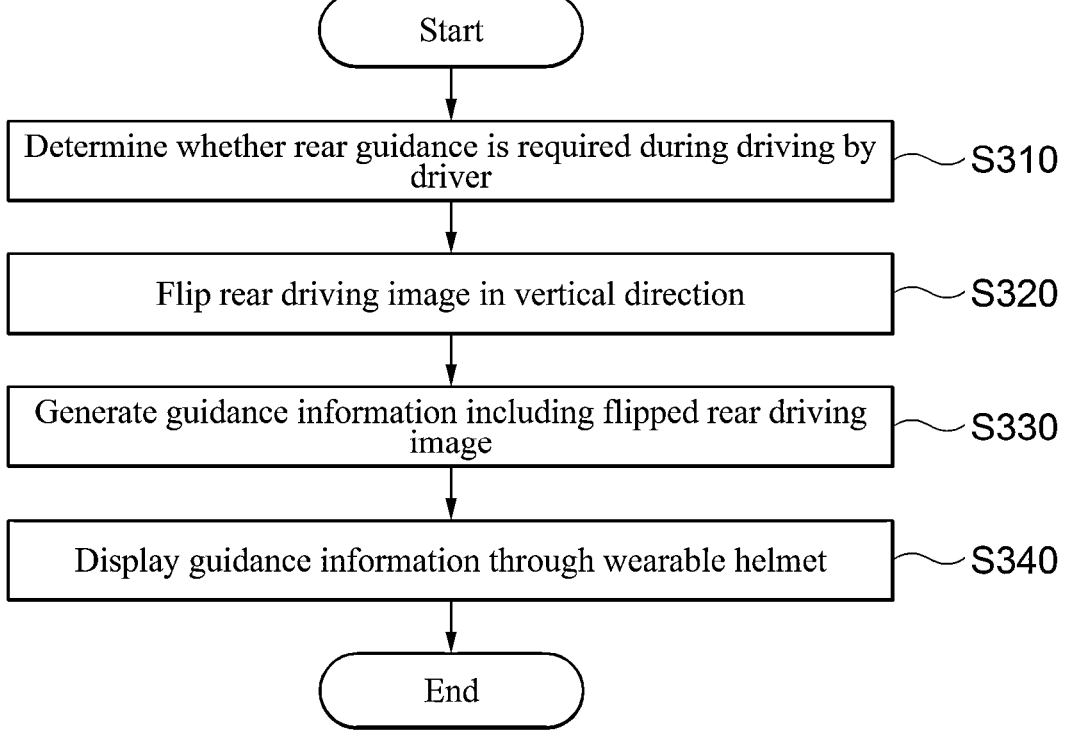

Start

Determine whether rear guidance is required during driving by driver — S310

Flip rear driving image in vertical direction — S320

Generate guidance information including flipped rear driving image — S330

Display guidance information through wearable helmet — S340

End

200

FIG. 12A
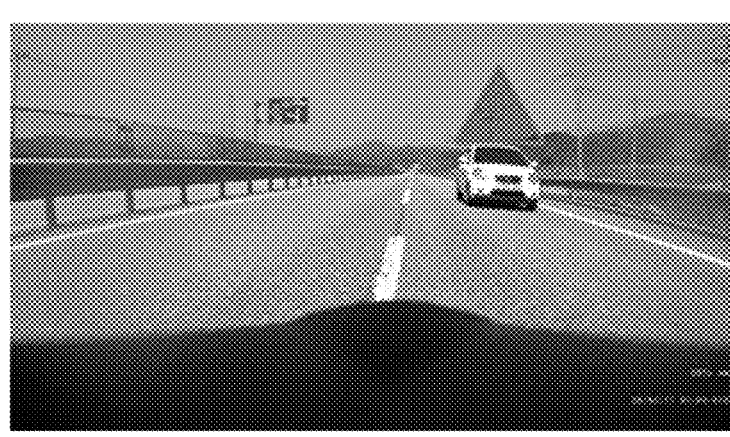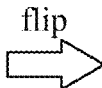
flip
FIG. 12B
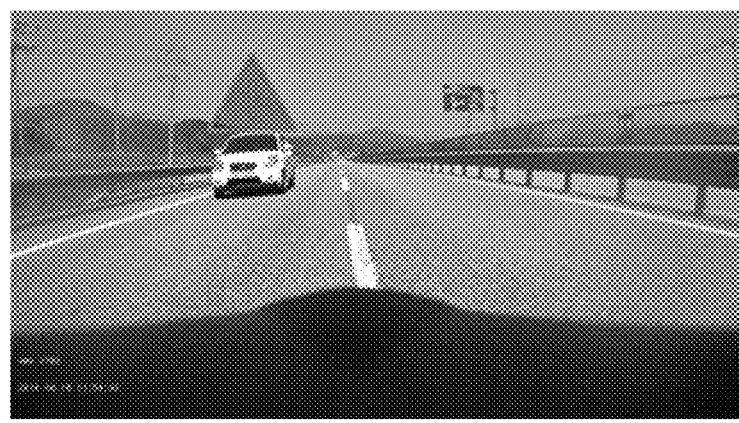

METHOD, APPARATUS, AND PROGRAM FOR PROVIDING IMAGE-BASED DRIVING ASSISTANCE GUIDANCE IN WEARABLE HELMET

CROSS-REFERENCE TO RELATED APPLICATION

This application claims the priority and benefit of Korean Patent Application No. 10-2022-0096347 filed on Aug. 2, 2022, and Korean Patent Application No. 10-2023-0100721 filed on Aug. 1, 2023, with the Korean Intellectual Property Office, the disclosure of which is incorporated herein by reference.

BACKGROUND OF THE INVENTION

1. Field of the Invention

The present invention relates to a technique for generating and providing guidance information helpful for safe driving of a moving object using an image.

2. Description of the Related Art

Personal mobility (PM), such as electric kickboards, electric bicycles, Ninebot-electric wheels, and electric motorcycles, which not only are eco-friendly compared to automobiles but also have strengths in parking and medium-distance driving, have come into prominence as a future means of transportation.

Also, in recent years, as personal mobility sharing services and the like have been activated, the number of users using personal mobility on roads or sidewalks has increased.

In line with the increase in the usage rate of personal mobility, the problem of personal mobility safety has emerged, and as a solution, the application of advanced driver assistance systems (ADAS), which have been used in conventional automobiles, to personal mobility in a head-up-display (HUD) manner has been discussed.

However, unlike displaying an HUD through a windshield of a vehicle, personal mobility, such as motorcycles or kickboards, display a HUD through a helmet worn by the driver, and therefore, it may be difficult to apply the HUD to personal mobility.

SUMMARY

An aspect of the present invention may provide a method, apparatus, program for providing image-based driving assistance guidance in a wearable helmet, capable of generating guidance information for assisting driving of a driver of a moving object and displaying the generated guidance information through a wearable helmet.

According to an aspect of the present invention, a method for providing an image-based driving assistance guidance in a wearable helmet may include: determining whether guidance is required during a driving by a driver; acquiring a driving image of a moving object that the driver drives; generating guidance information for assisting the driving of the driver based on the driving image when it is determined that the guidance is required; and displaying the generated guidance information through the wearable helmet.

The guidance may include guidance on a front of the moving object and guidance on a rear of the moving object, and the determining whether the guidance is required may include determining whether at least one of the guidance on the front and the guidance on the rear is required based on at least one of speed information of a moving object, direction indicator information of the moving object, steering operation information of the moving object, rotation direction information of the driver's head, and surrounding object information of the moving object.

The generating of the moving object may include flipping a rear driving image of the moving object in a vertical direction and generating guidance information including the flipped rear driving image, when it is determined that guidance is required.

The displaying of the generated guidance information may include displaying guidance information including the flipped rear driving image outside the driver's field of view.

The generating of the guidance information may further include: comparing an observation view of a display of the wearable helmet with an observation view of an image capturing apparatus capturing the driving image when it is determined that guidance on the front is required; and determining an overlapping region and a non-overlapping region between the observation view of the display of the wearable helmet and the observation view of the image capturing apparatus according to a comparison result.

The generating of the guidance information may further include detecting a guidance object to be guided from the driving image by distinguishing between the overlapping region and the non-overlapping region.

The generating of the guidance information may further include generating the guidance information based on at least one of type information of the detected guidance object, image position information of the guidance object, a distance to the guidance object, and observation field position information.

The displaying of the generated guidance information may further include calculating a correlation value between a coordinate system of a moving object and a coordinate system of the wearable helmet.

The displaying of the generated guidance information may include: determining a mapping position of the guidance information based on the correlation value; and locating the guidance information at the determined mapping position.

The displaying of the generated guidance information may include displaying the generated guidance information at a position related to the guidance object.

According to another aspect of the present invention, an apparatus for providing an image-based driving assistance guidance in a wearable helmet may include: a determining unit determining whether guidance is required during a driving by a driver; an image acquiring unit acquiring a driving image of a moving object that the driver drives; a generating unit generating guidance information for assisting the driving of the driver based on the driving image when the guidance is required; and a display unit displaying the generated guidance information through the wearable helmet.

The guidance may include the guidance includes guidance on a front of the moving object and guidance on a rear of the moving object, and the determining unit determining whether the guidance is required may determine whether at least one of the guidance on the front and the guidance on the rear is required based on at least one of speed information of a moving object, direction indicator information of the moving object, steering operation information of the moving object, rotation direction information of the driver's head, and surrounding object information of the moving object.

The generating unit generating the guidance information may flip a rear driving image of the moving object in a vertical direction and generate guidance information including the flipped rear driving image, when it is determined that guidance on the rear is required.

The display unit displaying the generated guidance information may display guidance information including the flipped rear driving image outside the driver's field of view.

The generating unit generating the guidance information may include an observation view comparing unit comparing an observation view of a display of the wearable helmet with an observation view of an image capturing apparatus capturing the driving image when it is determined that guidance on the front is required and determining an overlapping region and a non-overlapping region between the observation view of the display of the wearable helmet and the observation view of the image capturing apparatus according to a comparison result.

The generating unit generating the guidance information may further include a detecting unit detecting a guidance object to be guided from the driving image by distinguishing between the overlapping region and the non-overlapping region.

The generating unit generating the guidance information may further include a guidance information generating unit generating the guidance information based on at least one of type information of the detected guidance object, image position information of the guidance object, a distance to the guidance object, and observation field position information.

The display unit displaying the generated guidance information may calculate a correlation value between a coordinate system of a moving object and a coordinate system of the wearable helmet.

The display unit displaying the generated guidance information may determine a mapping position of the guidance information based on the correlation value and locates the guidance information at the determined mapping position.

The display unit displaying the generated guidance information may display the generated guidance information at a position related to the guidance object.

According to another aspect of the present invention, a wearable helmet may include: a glass portion located in a driver's field of view; a driving image acquiring unit acquiring a driving image; a determining unit determining whether guidance is required during a driving by the driver; a generating unit generating guidance information for assisting the driving of the driver based on a driving image when the guidance is required; and a display unit displaying the generated guidance information on the glass portion.

The driving image may be an image captured by an image capturing apparatus provided in the moving object or an image captured by an image capturing apparatus provided in the wearable helmet.

According to another aspect of the present invention, there is provided a computer-readable recording medium in which a program for performing a method for providing an image-based driving assistance guidance described above is stored.

According to another aspect of the present invention, there is provided a program stored in a computer-readable recording medium including a program code for executing the method for providing an image-based driving assistance guidance described above.

According to various embodiments of the present disclosure, guidance information may be displayed at an optimal position in a field of view of a driver wearing a wearable helmet.

Further, according to various embodiments of the present disclosure, the driver's safety and convenience may be improved by providing guidance information on front guidance target to the field of view of the driver wearing the wearable helmet.

In addition, according to various embodiments of the present disclosure, by providing guidance information on the rear through a flipped rear image, it is possible to solve a problem that leads to a serious accident due to the driver not detecting a vehicle approaching from the rear.

BRIEF DESCRIPTION OF DRAWINGS

FIG. 6 is a flowchart illustrating a method for providing front driving assistance guidance in a wearable helmet according to an embodiment of the present invention.

FIG. 7 is a flowchart illustrating a method of displaying guidance information through a wearable helmet according to an embodiment of the present invention.

FIG. 8 is a flowchart illustrating a method for providing rear driving assistance guidance in a wearable helmet according to an embodiment of the present invention.

FIGS. 10 to 12B are diagrams illustrating implementation examples of displaying guidance information according to an embodiment of the present invention.

DETAILED DESCRIPTION

The following description illustrates only a principle of the present invention. Therefore, those skilled in the art may invent various devices that implement the principle of the present invention and are included in the spirit and scope of the present invention although not clearly described or shown in the present specification. In addition, it is to be understood that all conditional terms and embodiments listed in the present specification are obviously intended only to allow those skilled in the art to understand a concept of the present invention in principle, and the present invention is not limited to the embodiments and states particularly listed as described above.

The above-mentioned objects, features, and advantages will become more obvious from the following detailed description provided in relation to the accompanying drawings. Therefore, those skilled in the art to which the present invention pertains may easily practice a technical idea of the present invention.

Further, in describing the present invention, in the case in which it is determined that a detailed description of a known technology associated with the present invention may unnecessarily make the gist of the present invention unclear, it will be omitted. Hereinafter, embodiments of the present invention will be described in detail with reference to the accompanying drawings.

Figure 1:
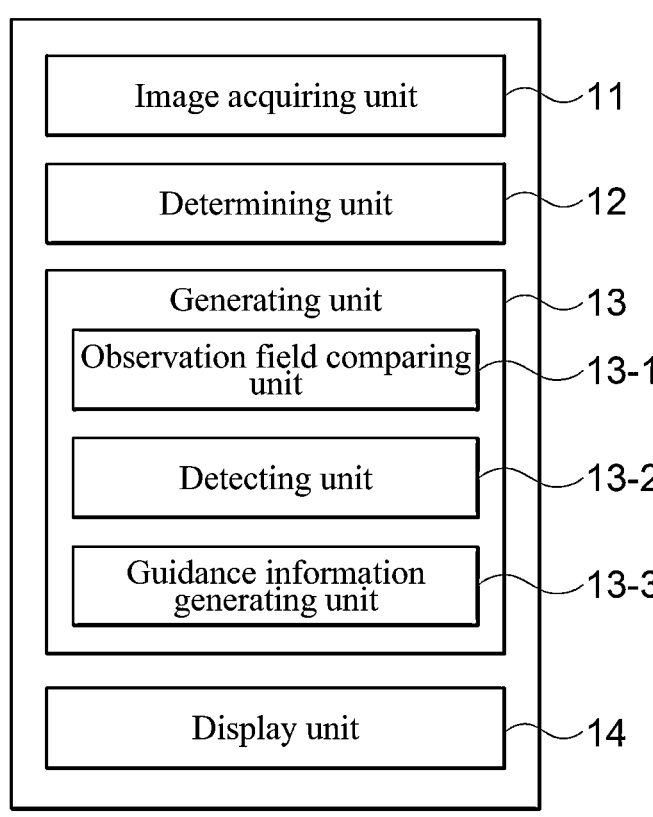
FIG. 1 is a block diagram illustrating an apparatus for providing image-based driving assistance guidance according to an embodiment of the present invention.

FIG. 1 is a block diagram illustrating an apparatus for providing image-based driving assistance guidance according to an embodiment of the present invention. Referring to FIG. 1, an apparatus 10 for providing image-based driving assistance guidance may include some or all of an image acquiring unit 11, a determining unit 12, a generating unit 13, and a display unit 14. Here, the apparatus 10 for providing image-based driving assistance guidance may generate and display various guidance information visualized in a field of view of a driver of a moving object wearing a wearable helmet. At this time, various guidance information may be displayed on a display installed in the helmet, and the display may be transparent and spaced apart from a shield of the helmet so that a portion or the entirety of the helmet overlaps the display.

The moving object is a movable dynamic object and may be a vehicle, motorcycle, pedestrian, kickboard, bicycle, personal mobility, and the like. Particularly, preferably, the moving object may be a dynamic object requiring a helmet to be worn during driving.

The image acquiring unit 11 may acquire a driving image captured by an image capturing apparatus of the moving object or a separate image capturing apparatus. For example, the image acquiring unit 11 may acquire a driving image captured by the image capturing apparatus installed in the moving object in real time while the moving object is driving. As another example, the image acquiring unit 11 may acquire a driving image captured by an image capturing apparatus (e.g., an image capturing apparatus installed on a wearable helmet or an image capturing apparatus held by the wearer's hand) of a user of the moving object in real time, while the moving object is driving.

Here, the image capturing apparatus described above may include a first image capturing apparatus capturing a driving image in front of the moving object and at least one second image capturing apparatus capturing a driving image other than the front of the moving object.

Accordingly, the image acquiring unit 11 may acquire the driving image in front of the moving object and the driving image other than the front of the moving object.

In addition, the driving image acquired by the image acquiring unit 11 may include a dynamic object, such as a pedestrian, motorcycles, and a vehicle, and static objects, such as a fixedly installed structure.

The determining unit 12 may determine whether guidance is required during a driving by a driver. Here, the guidance may include front guidance and rear guidance.

Specifically, the determining unit 12 may determine whether at least one of front guidance and rear guidance is required for the corresponding driver based on speed information of the moving object, direction indicator information of the moving object, steering operation information of the moving object, rotation direction information of the driver's head, and surrounding obstacle information.

For example, if the speed of the moving object is lower than a preset minimum speed or the speed of the moving object is higher than a preset maximum speed based on the speed information of the moving object, the determining unit 12 may determine that at least one of front guidance and rear guidance is required.

As another example, the determining unit 12 may determine whether the direction indicators respectively corresponding to left rotation and right rotation of the moving object are turned on or off based on direction indicator information of the moving object, and when it is determined that the direction indicator is turned on, the determining unit 12 may determine that rear guidance is required.

As another example, the determining unit 12 may determine left or right rotation of the moving object based on steering operation information of the moving object, and when a left or right rotation is determined, the determining unit 12 may determine that rear guidance is required.

As another example, the determining unit 12 may determine whether an object exists in front of the moving object based on surrounding object information, and determine that front guidance is required if an object exists.

As another example, the determining unit 12 may determine whether the moving object deviates from a lane according to a steering wheel angle or a driving direction of the moving object in an OFF state of the direction indicator lamp or when the moving object corresponds to a condition for changing lanes, the determining unit 12 may determine that rear guidance is required.

In addition, the determining unit 12 may determine whether guidance is required by using a different determination method depending on an installation position of an image capturing apparatus used for acquiring a driving image by the image acquiring unit 11.

For example, when the image capturing apparatus is attached to the helmet, the determining unit 12 may determine that rear guidance is required according to a change in a direction of the user's gaze. In this case, the change in the direction of the user's gaze may be acquired using a sensor in the helmet that detects the change in the direction of the user's gaze by tracking a movement direction of the user's pupil.

As another example, when the image capturing apparatus is attached to a moving object, the determining unit 12 may determine that rear guidance is required according to the direction indicator of the moving object, or may determine that rear guidance or front guidance is required when the moving object is stopped.

Here, the surrounding object information may be an object, such as another moving object or a pedestrian located near the moving object, and surrounding object information may be generated as an object is detected from a driving image by a detecting unit 13-2 to be described below.

In addition, the speed information of the moving object may be calculated based on position information acquired through a global navigation satellite system (GNSS), based on a speed value acquired from an electronic control unit (ECU) of the moving object, or based on a sensing value of a speed sensor.

In addition, direction indicator information of the moving object may be calculated based on data acquired from the ECU of the moving object or may be calculated based on a sensing value of a voice detection sensor for the direction indicator lamp. Further, the steering operation information of the moving object may be calculated based on data acquired from the ECU of the moving object or may be calculated based on a sensing value of a steering rotation detection sensor, such as a gyro sensor. In addition, the rotation direction information of the driver's head may be calculated based on a sensing value of a head rotation detection sensor, such as a gyro sensor.

Meanwhile, when it is determined that guidance is required in the determining unit 12, the generating unit 13 may generate guidance information to assist the driver's driving. Here, the guidance information may include various forms of display information, such as graphics, icons, images, and text displayed in the driver's field of view for driver guidance. In addition, the guidance information may include voice information that the driver may confirm by sound.

The generating unit 13 may generate front guidance information when the determining unit 12 determines that front guidance is required, and generates rear guidance information when the determining unit 12 determines that rear guidance is required. Here, the front guidance information and the rear guidance information generated by the generating unit 13 may be displayed at different points of time or at the same point of time according to the determination of the determining unit 12.

Here, the generating unit 13 may include an observation field comparing unit 13-1, a detecting unit 13-2, and a guidance information generating unit 13-3.

Specifically, when it is determined that front guidance is required, the observation field comparing unit 13-1 may compare an observation field of the display of the wearable helmet with an observation field of the image capturing apparatus for capturing a front driving image, and determine an overlapping region and a non-overlapping region between the observation field of the display of the wearable helmet and the observation field of the image capturing apparatus according to a comparison result. This will be described in more detail with reference to FIGS. 2A-D.

Figure 2A:
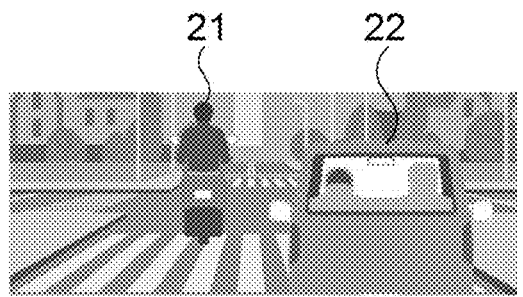
FIGS. 2A-D are diagrams illustrating an observation view of a display of a wearable helmet and an observation view of an image capturing apparatus according to an embodiment of the present invention.
Figure 2B:
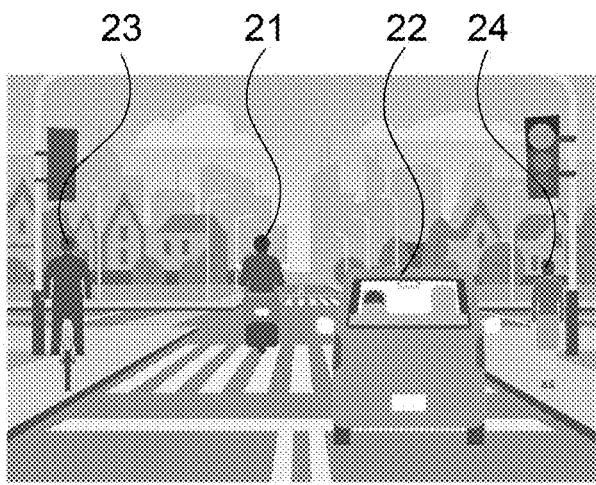

FIG. 2A is a view illustrating an observation field of the display of the wearable helmet, and FIG. 2B is a view illustrating an observation field of the image capturing apparatus. Here, the observation field may refer to a field of view (FOV), and the observation field of the display of the wearable helmet may refer to an observation field of a head up display (HUD) of the wearable helmet.

The observation field of the display of the wearable helmet may represent a range of displaying various information in a field of view of the driver wearing the wearable helmet, and may be generally smaller than an observation field of the image capturing apparatus as shown in FIGS. 2A and 2B.

Figure 2C:
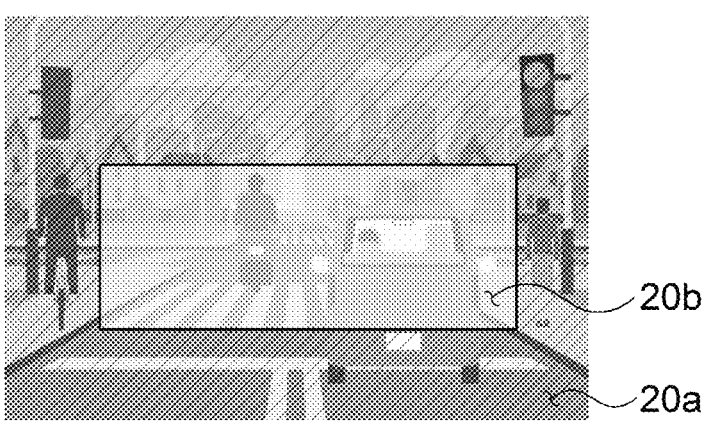

FIG. 2C is a view comparing the observation field of the display of the wearable helmet and the observation field of the image capturing apparatus, and the observation field comparing unit 13-1 may compare an observation field of the display of the wearable helmet shown in FIG. 2A and an observation field of the image capturing apparatus for capturing a front driving image shown in FIG. 2B and determine an overlapping region 20b of the observation field and the non-overlapping region 20a of the observation field according to a comparison result.

Here, the non-overlapping region 20a may be a region excluding the observation field of the display from the observation field of the image capturing apparatus capturing the front driving image, and may be a region identified by the hatched lines in FIG. 2C.

Here, the overlapping region 20b and the non-overlapping region 20a may vary in real time depending on a change of a reference point (e.g., an optical center of the image capturing apparatus) of the observation field of the image capturing apparatus and a change in a reference point (e.g., the center of the observation field) of the observation field of the display of the wearable helmet.

For example, when the driver wearing the wearable helmet rotates his head in at least one of a roll direction, a yaw direction, and a pitch direction, while driving on the moving object equipped with the image capturing apparatus, the overlapping region 20b and the non-overlapping region 20a may be different.

Meanwhile, if the observation fields of the display installed in the helmet and the shield of the helmet are different (for example, when the size of the display and the size of the shield of the helmet are different and only partially overlap each other), the non-overlapping region may be determined by considering the observation field of the helmet shield.

Figure 2D:
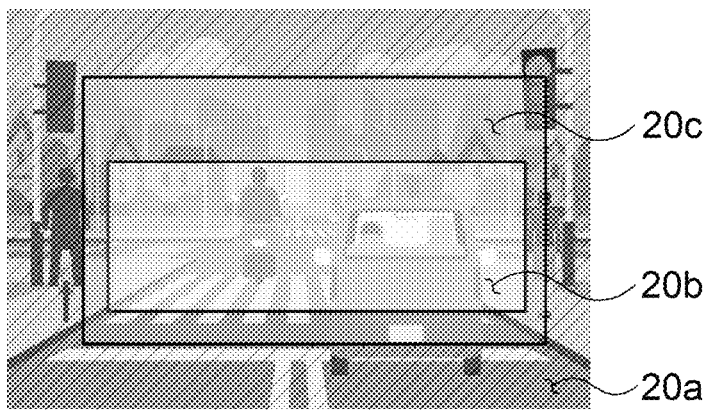

FIG. 2D is a view illustrating comparison between an observation field of the display of the wearable helmet, an observation field of the image capturing apparatus, and an observation field of the helmet shield. The observation field comparing unit 13-1 may compare the observation field of the display of the helmet with the observation field of the image capturing apparatus capturing a front driving image, and determine overlapping regions 20b and 20c of the observation field and a non-overlapping region 20a of the observation field in consideration of the observation field of the helmet shield.

Here, the overlapping regions 20b and 20c are the observation field of the helmet shield including the observation field of the display, and the non-overlapping region 20a may be a region excluding the observation field of the display and the observation field of the helmet shield from the observation field of the image capturing apparatus capturing the front driving image, which may be a region identified by the hatched lines in FIG. 2D.

That is, when there is a difference between the observation fields of the display and the helmet shield, the observation field comparing unit 13-1 may determine an overlapping region and a non-overlapping region of the observation field of the display of the wearable helmet and the observation field of the image capturing apparatus in consideration of the observation field of the helmet shield additionally. Hereinafter, a case in which the observation field of the display and the observation field of the helmet shield are the same will be described.

Meanwhile, the detecting unit 13-2 may detect a guidance object to be guided based on a driving image acquired by the driving image acquiring unit 11.

Specifically, when the overlapping region 20b and the non-overlapping region 20a are determined by the observation field comparing unit 13-1, the detecting unit 13-2 may detect guidance objects 21 and 22 of the overlapping region 20b and guidance objects 23 and 24 of the non-overlapping region 20a distinguishably.

In this case, the detecting unit 13-2 may detect a guidance object in the driving image using a neural network model. For example, the detecting unit 13-2 may input a driving image in units of frames to a neural network model and acquire a driving image including a bounding box representing a region of a guidance object in the driving image and type information of the guidance object corresponding to the bounding box. Here, the neural network model may be, for example, an object recognition model based on a CNN network, and a single shot multibox detector (SSD) algorithm may be used, and other algorithms, such as RefineDet and YOLO (You Only Look Once), may be used.

Meanwhile, the guidance object detected by the detecting unit 13-2 may include the aforementioned dynamic and static objects.

Meanwhile, according to the operation of the detecting unit 13-2 described above, at least one of type information of the guidance object, image position information of the guidance object, and observation field position information of the guidance object may be generated.

Here, the type information of the guidance object may be information enabling identification of the type of guidance object (e.g., vehicle, sign, pedestrian, etc.). Also, the image position information of the guidance object may be information indicating a position of the guidance object in the driving image. Further, the observation field position information of the guidance object may be information indicating whether the guidance object is located in the overlapping region or the non-overlapping region.

Meanwhile, the detecting unit 13-2 may be implemented to select a guidance object that may collide with a moving object, among the detected guidance objects, as a final guidance target. In this case, the detecting unit 13-2 may calculate a possibility of collision with adjacent objects based on at least one of speed information, position information, distance information, and direction information of the adjacent objects and the moving object.

As another embodiment, the detecting unit 13-2 may select, as a guidance object, an object that may affect the driving of the moving object among objects present in the driving image of the moving object.

Meanwhile, the guidance information generating unit 13-3 may generate guidance information for assisting a driver's driving or driving a moving object. Here, front guidance information for front guidance while the moving object is driving and rear guidance information for rear guidance while the moving object is driving may be included.

Such guidance information may include information displayed in various shapes, such as graphics, icons, images, texts, and the like, and voice information that a driver may identify by sound.

For example, when the determining unit 12 determines that rear guidance is required, the guidance information generating unit 13-3 may flip a rear driving image in a vertical direction and generate guidance information including the flipped rear driving image.

Specifically, the guidance information generating unit 13-3 may generate a virtual central axis in the vertical direction within the rear driving image, and flip the rear driving image to be reversed horizontally based on the virtual central axis.

For example, the guidance information generating unit 13-3 may flip the rear driving image shown in FIG. 12A in the vertical direction to convert the rear driving image into a rear driving image shown in FIG. 12B. Here, the rear driving image after the flip (FIG. 12B) may be symmetrical with the rear driving image before the flip (FIG. 12A).

Figure 11:
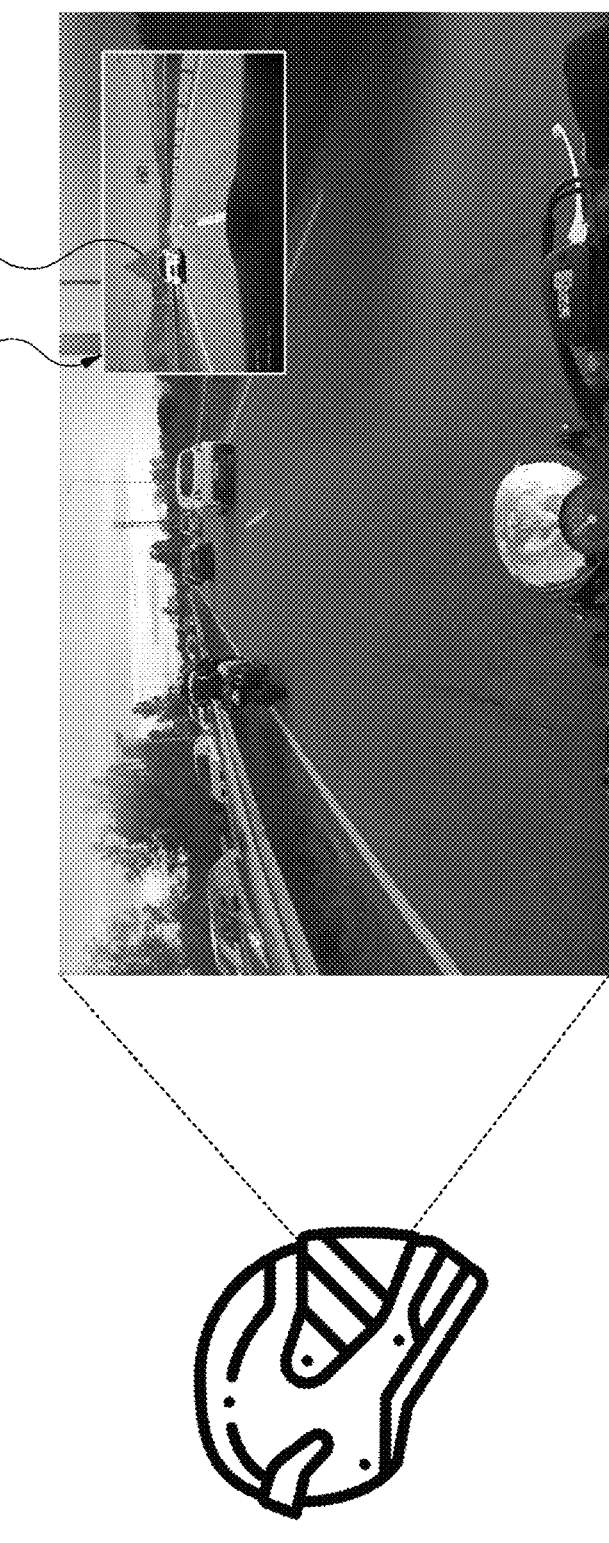

In this case, the display unit 14 may display guidance information including the flipped rear driving image in the field of view of the driver wearing the wearable helmet. An example of such rear guidance may be as shown in FIG. 11.

As another example, when the determining unit 12 determines that front guidance is required, the guidance information generating unit 13-3 may generate guidance information based on at least one of the type information of the guidance object detected by the detecting unit 13-2, the image position information, and the observation field position information.

Specifically, when the guidance object is located in the overlapping region, the guidance information generating unit 13-3 may generate guidance information indicating information in the position of the guidance object based on image position information. Here, the position of the guidance object may be a position of the guidance object displayed in the driving image. In addition, the guidance information may be displayed as symbols obtained by imaging the type of the guidance object according to the type information of the guidance object, so that the guidance information may be different in display form. For example, when the guidance object is a vehicle, the guidance information may be a graphic image of a vehicle type, when the guidance object is a pedestrian, the guidance information may be a graphic image of a pedestrian shape, and when the guidance object is a driving sign, guidance information may be a graphic image in the form of a sign.

In addition, when the guidance object is located in the non-overlapping region, the guidance information generating unit 13-3 may generate guidance information indicating information in a position of the non-overlapping region corresponding to a direction in which the guidance object is located based on the observation field position information and the image position information.

Figure 10:
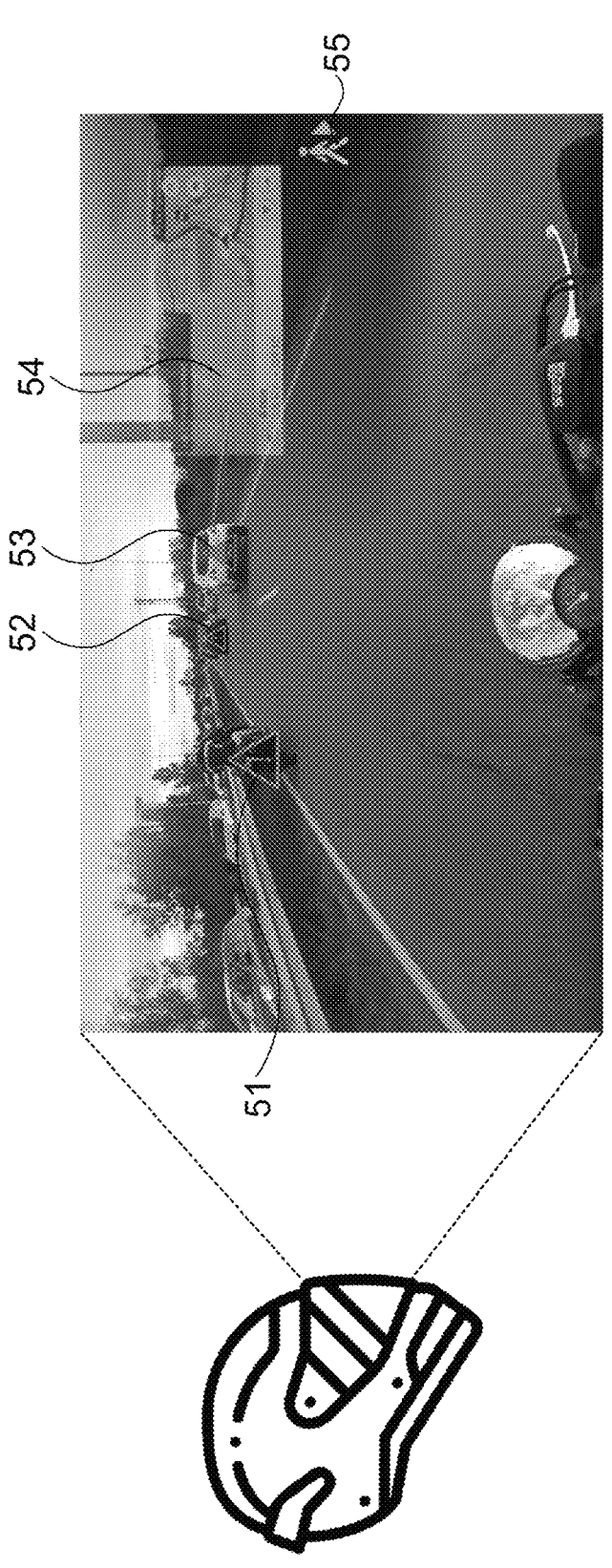

In this case, the display unit 14 may display guidance information in the field of view of the driver wearing the wearable helmet. An example of such front guidance may be as shown in FIG. 10.

That is, as described above, the display unit 14 may display the guidance information generated by the guidance information generating unit 13-3 in the field of view of the driver wearing the wearable helmet. Here, the display unit 14 may be implemented as, for example, a HUD of a wearable helmet.

However, at this time, if the correlation between a coordinate system of the wearable helmet worn on the driver's head and a coordinate system of the image capturing apparatus provided in the moving object is not considered, the display unit 14 may not be able to display the guidance information generated by the generating unit 13 in an appropriate position in the field of view of the driver wearing a wearable helmet. In particular, in the case of front guidance that displays guidance information in the form of graphics in a position of a guidance object located in the front, unlike rear guidance displayed by flipping a rear driving image, the guidance information may not be displayed in an accurate position if the correlation between the coordinate systems is not considered.

Accordingly, the display unit 14 according to the present invention may calculate a correlation value between the coordinate system of the moving object and the coordinate system of the wearable helmet, determine a mapping position of the guidance information generated by the generating unit 13 using the calculated correlation value, and locate the guidance information to the determined mapping position, thereby displaying the guidance information in the optimal position in the driver's field of view. Here, the correlation value indicates a mapping relationship (transformation relationship) between 2D image coordinates or 3D camera coordinates of an object, and may be in the form of a matrix. The operation of the display unit 14 will be described in more detail with reference to FIGS. 3 and 4.

Figure 3:
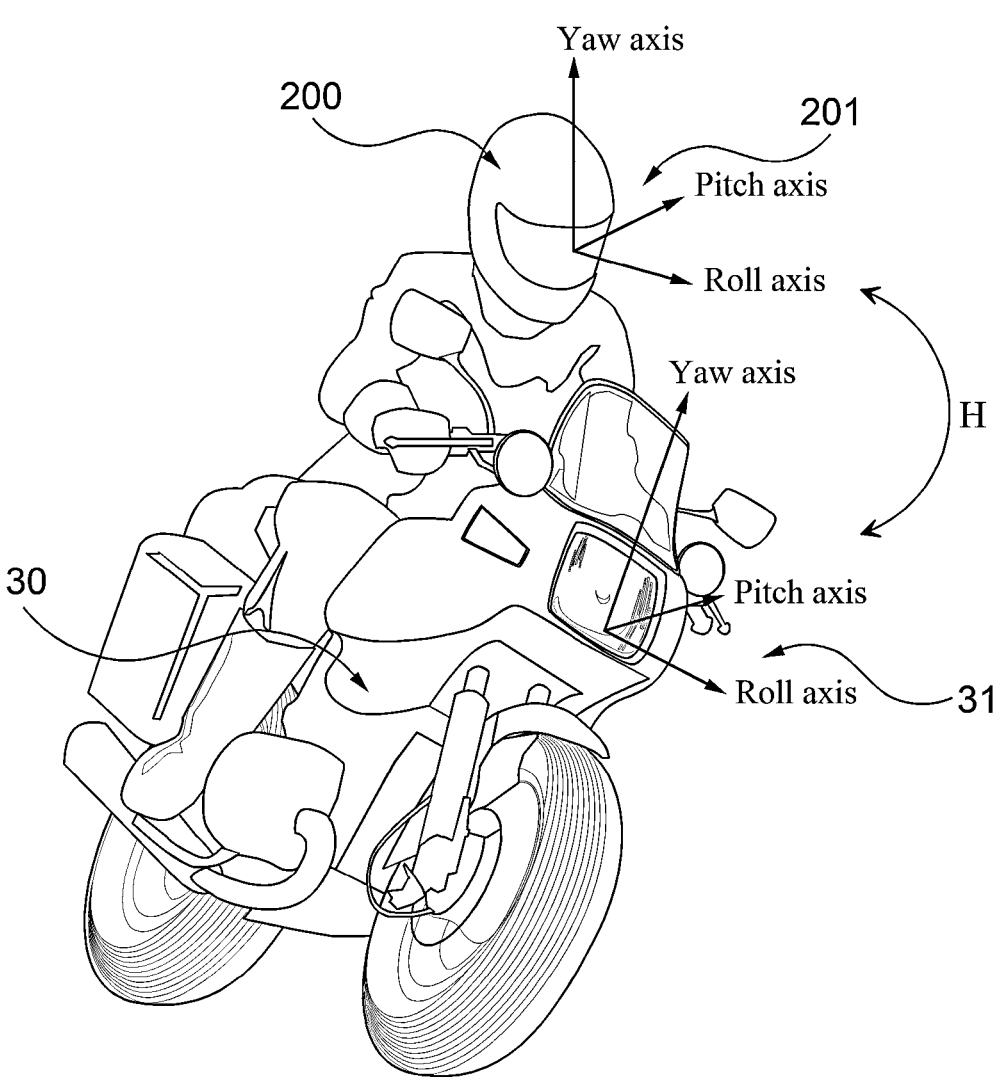
FIGS. 3 and 4 are diagrams illustrating a correlation between a coordinate system of a moving object and a coordinate system of a wearable helmet according to an embodiment of the present invention.
Figure 4:
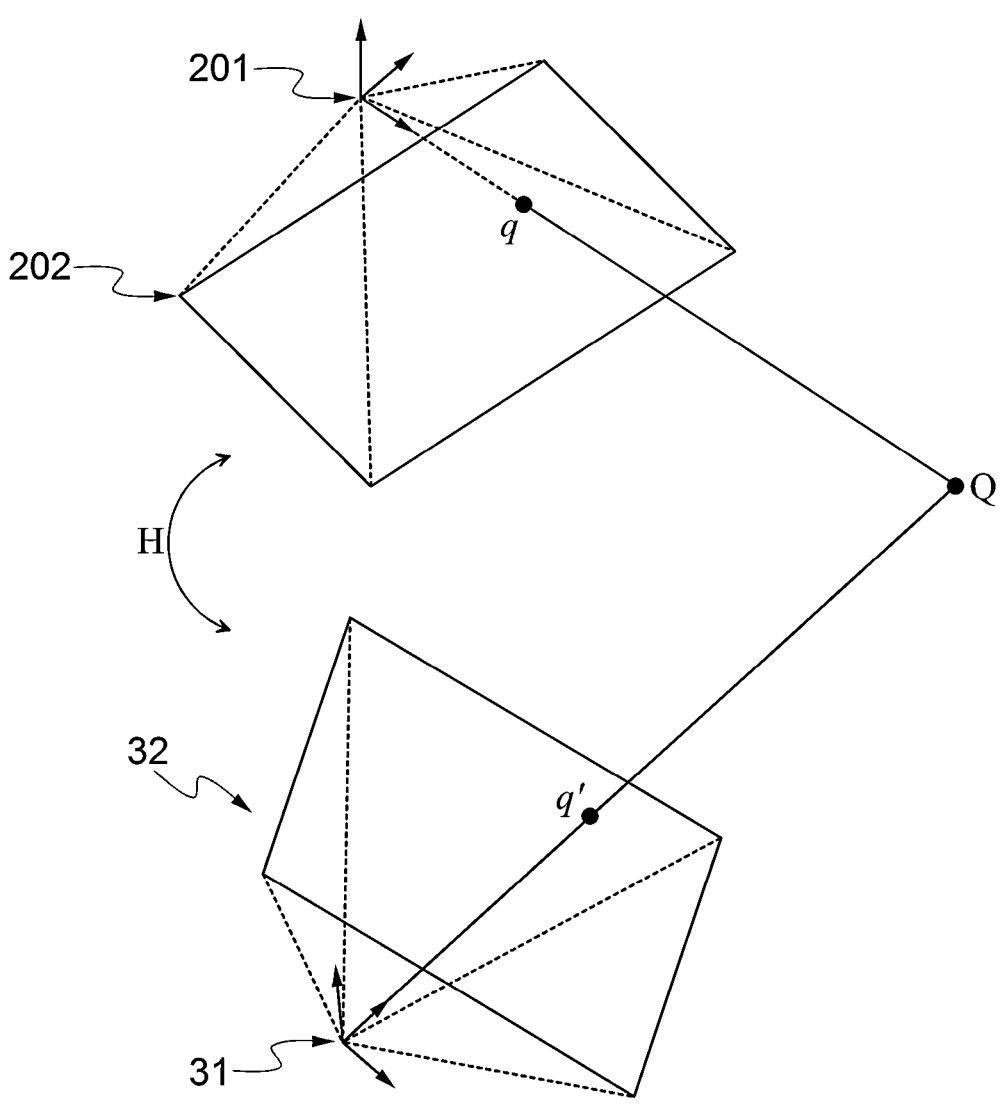

FIGS. 3 and 4 are diagrams illustrating a correlation between a coordinate system of a moving object and a coordinate system of a wearable helmet according to an embodiment of the present invention.

Referring to FIG. 3, for example, a coordinate system 201 of the wearable helmet 200 may refer to a coordinate system of the HUD, and a coordinate system 31 of the moving object 30 may refer to a coordinate system of the image capturing apparatus provided in the moving object 30. At this time, a reference point of the coordinate system 201 of the wearable helmet 200 may be the center of the driver's field of view wearing the wearable helmet 200, and a reference point of the coordinate system 31 of the moving object 30 may be an optical center of the image capturing apparatus.

In addition, a correlation value H may represent a geometric relationship between matching pairs q,q' of the image 32 captured by the image capturing apparatus of the moving object 30 and the field of view 202 of the driver wearing the wearable helmet 200. In this case, the display unit 14 may differently determine a calculation method of a correlation value according to the shape of the guidance object detected by the detecting unit 13-2.

For example, when the guidance object detected by the detecting unit 13-2 is a planar object (e.g., a guide sign), the display unit 14 may calculate a correlation value (or homography) using a direct linear transformation (DLT) algorithm based on the pairs between the planar objects.

As another example, when the guidance object is a 3D object (e.g., a vehicle, a pedestrian, etc.) having a 3D volume, the display unit 14 may calculate a fundamental matrix or essential matrix as a correlation value. Here, the essential matrix is a matrix describing a geometric relationship between matching pairs in a normalized image plane, and represents a transformation relationship in the coordinate system from which K, a camera internal parameter matrix, has been removed. In addition, a fundamental matrix is a matrix representing a geometric relationship between actual pixel coordinates of two images including camera parameters.

As another example, the display unit 14 may calculate and use a positional difference between the wearable helmet 200 and the image capturing apparatus installed in the moving object 30 as a correlation value.

Meanwhile, the display unit 14 may determine a mapping position of guidance information using the calculated correlation value. In detail, the display unit 14 may determine a mapping position of the guidance information within the field of view of the driver wearing the wearable helmet by applying the calculated correlation value to the mapping position within the driving image of the guidance information generated by the generating unit 13.

Also, the display unit 14 may display the guidance information in an optimal position of the driver's field of view by locating the guidance information at the determined mapping position.

For example, the display unit 14 may display the guidance information generated by the generating unit 13 at the position of the guidance object in the driver's field of view.

The apparatus 10 for providing image-based driving assistance guidance according to an embodiment of the present invention may be implemented using software, hardware, or a combination thereof. For example, according to hardware implementation, application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and other electrical units for performing functions.

Hereinafter, a method for providing image-based driving assistance guidance according to an embodiment of the present invention will be described in detail with reference to the accompanying drawings.

Figure 5:
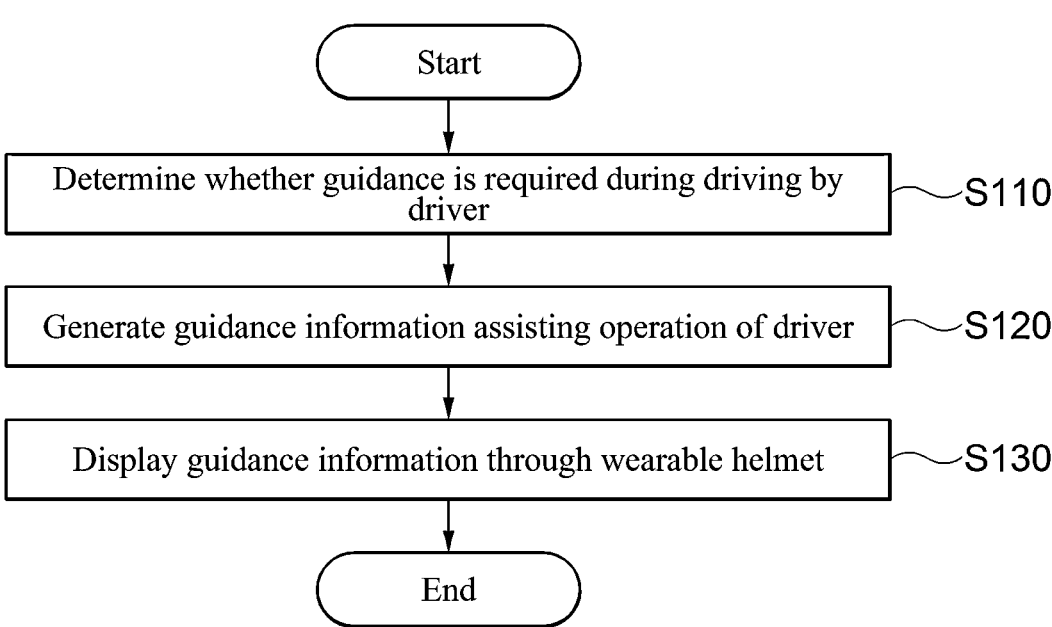
FIG. 5 is a flowchart illustrating a method for providing image-based driving assistance guidance in a wearable helmet according to an embodiment of the present invention.

FIG. 5 is a flowchart illustrating a method for providing image-based driving assistance guidance according to an embodiment of the present invention. Referring to FIG. 5, the apparatus 10 for providing image-based driving assistance guidance may include an operation of determining whether guidance is required while the driver is driving (S110). Here, in the operation of determining, whether at least one of front guidance and rear guidance is required may be determined based on at least one of speed information of the moving object, direction indicator information of the moving object, steering operation information of the moving object, rotation direction information of the driver's head, and surrounding object information. Also, the guidance may include front guidance and rear guidance.

Further, the apparatus 10 for providing image-based driving assistance guidance may perform an operation of generating guidance information to assist the driver's driving (S120) and an operation of displaying the generated guidance information through the wearable helmet (S130), when guidance is required.

Hereinafter, front guidance and rear guidance will be described in more detail with reference to the drawings.

FIG. 6 is a flowchart illustrating a method for providing a front driving assistance guidance according to an embodiment of the present invention. Referring to FIG. 6, first, the apparatus 10 for providing image-based driving assistance guidance may determine whether front guidance is required while the driver is driving (S210). Specifically, the apparatus 10 for providing image-based driving assistance guidance may determine whether a dynamic object, such as another moving object or a pedestrian, and a static object, such as a sign, exists in front of the moving object based on surrounding object information located around the moving object, and when an object exists, the apparatus 10 for providing image-based driving assistance guidance may determine that front guidance is required.

Next, the apparatus 10 for providing image-based driving assistance guidance may compare an observation field of the display of the wearable helmet with an observation field of the image capturing apparatus that captures a driving image (S220).

Also, the apparatus 10 for providing image-based driving assistance guidance may determine an overlapping region and a non-overlapping region between the observation field of the display of the wearable helmet and the observation field of the image capturing apparatus according to a comparison result (S230).

In addition, the apparatus 10 for providing image-based driving assistance guidance may detect a guidance object to be guided from the driving image by distinguishing between an overlapping region and a non-overlapping region (S240). For example, the apparatus 10 for providing image-based driving assistance guidance may detect a guidance object in the driving image by using a neural network model. According to the detection operation (S240), at least one of type information of the guidance object, image position information of the guidance object, and observation field position information of the guidance object may be generated.

In addition, the apparatus 10 for providing image-based driving assistance guidance may generate guidance information based on at least one of the type information of the detected guidance object, the image position information, and the observation field position information (S250).

In addition, the apparatus 10 for providing image-based driving assistance guidance may display the generated guidance information through the wearable helmet (S260). Here, the displaying operation (S260) will be described in more detail with reference to FIG. 7.

FIG. 7 is a flowchart illustrating a method of displaying generated guidance information through a wearable helmet according to an embodiment of the present invention. Referring to FIG. 7, the apparatus 10 for providing image-based driving assistance guidance may calculate a correlation value between a coordinate system of the moving object and a coordinate system of the wearable helmet (S251). Here, the correlation value H may represent a geometric relationship between matching pairs of the field of view of the driver wearing the wearable helmet and the image captured by the image capturing apparatus of the moving object.

Then, the apparatus 10 for providing image-based driving assistance guidance may determine a mapping position of guidance information based on the calculated correlation value (S252). Specifically, the apparatus 10 for providing image-based driving assistance guidance may determine the mapping position of the guidance information within the field of view of the driver wearing the wearable helmet by applying the calculated correlation value to the mapping position of the generated guidance information within the driving image.

Also, the apparatus 10 for providing image-based driving assistance guidance may locate the guidance information at the determined mapping position (S253). Accordingly, front guidance may be displayed through the wearable helmet.

FIG. 8 is a flowchart illustrating a method for providing rear driving assistance guidance according to an embodiment of the present invention. Referring to FIG. 8, the apparatus 10 for providing image-based driving assistance guidance may determine whether rear guidance is required while the driver is driving (S310).

For example, the apparatus 10 for providing image-based driving assistance guidance may determine whether direction indicators corresponding to left rotation and right rotation of the moving object are turned on or off based on direction indicator information of the moving object, and when it is determined that the direction indicator is turned on, the apparatus 10 for providing image-based driving assistance guidance may determine that rear guidance is required.

As another example, when the moving object deviates from a lane or when the moving object corresponds to a condition for changing lanes according to a steering wheel angle or a driving direction of the moving object in an OFF state of the direction indicator, the apparatus 10 for providing image-based driving assistance guidance may determine that rear guidance is required.

Also, when rear guidance is required, the apparatus for providing image-based driving assistance guidance may flip a rear driving image in a vertical direction (S320) and generate guidance information including the flipped rear driving image (S330).

In addition, the apparatus 10 for providing image-based driving assistance guidance may display the generated guidance information through the wearable helmet (S340).

Meanwhile, the apparatus 10 for providing image-based driving assistance guidance may be implemented as a single module of various devices and may display various guidance information in the field of view of the driver wearing a wearable helmet. This will be described in more detail with reference to FIG. 9.

Figure 9:
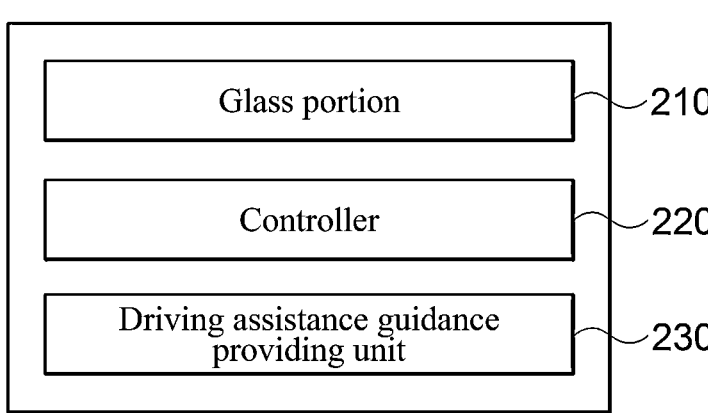
FIG. 9 is a block diagram illustrating a wearable helmet according to an embodiment of the present invention.

FIG. 9 is a block diagram illustrating a wearable helmet according to an embodiment of the present invention. Referring to FIG. 9, a wearable helmet 200 may include all or some of a glass portion 210, a controller 220, and a driving assistance guidance providing unit 230.

The driving assistance guidance providing unit 230 may operate in the same manner as that of the apparatus 10 for providing image-based driving assistance guidance described above, and in particular, the image acquired by the image acquiring unit 11 of the driving assistance guidance providing unit 230 may be an image captured by an image capturing apparatus provided in the moving object or an image captured by an image capturing apparatus provided in a wearable helmet.

The glass portion 210 is located in a direction in which the driver's field of view faces in the wearable helmet, and serves to protect the driver's eyes. Guidance information generated by the driving assistance guidance providing unit 230 may be displayed on the glass portion 210, and accordingly, various guidance information related to driving may be displayed in the field of view of the driver wearing the wearable helmet.

Meanwhile, the controller 220 may control the operation of the wearable helmet 200, and in particular, the controller 220 may control the driving assistance guidance providing unit 230 to generate various types of guidance information.

FIG. 10 is a diagram illustrating an implementation example of displaying front guidance information according to an embodiment of the present invention, and FIG. 11 is a diagram illustrating an implementation example of displaying rear guidance information according to an embodiment of the present invention.

Referring to FIG. 10, an apparatus 10 or 230 for providing image-based driving assistance guidance generates front guidance information 51, 52, 53, 54, or 55 to be displayed in the front field of view of the driver, determine display positions of the generated front guidance information 51, 52, 53, 54, and 55, and display the determined display positions in the front field of view of the driver.

Here, the first guidance information 51, 52, and 53 may be information for guiding a guidance object located in an overlapping region of an observation field of the image capturing apparatus and an observation field of the display of the wearable helmet, and for a guidance object located in the overlapping region, the apparatus 10 or 230 for providing image-based driving assistance guidance may display first guidance information in the form of an icon representing a collision warning in the case of a vehicle based on guidance object type information, and may display first guidance information in the position of the guidance object based on guidance object position information. Although not shown in FIG. 10, when the type information of the guidance object located in the overlapping region is a pedestrian or a sign, guidance information may be displayed in the form of an icon different from the front guidance information 51, 52, and 53.

Also, although the first guidance information is displayed in red in FIG. 10, the color may be changed according to a distance between the moving object and another object. For example, when the positions of the moving object and the guidance object are within a predetermined distance, the first guidance information may be displayed in red, and when the positions of the moving object and the guidance object are equal to or greater than the predetermined distance, the first guidance information may be displayed in green.

As another example, when the guidance object is located on a driving path of the moving object and is located on a path that may collide with the moving object, the guidance object may be displayed in red or the like in order to increase the driver's attention to the guidance object. Meanwhile, when the guidance object is not located on the driving path of the moving object and is not located on a path that may collide with the moving object, the guidance object may be displayed in green to guide the driver to pay attention to guidance objects with a high probability of collision, so that the driver's attention is maintained to be relatively low for guidance objects with a low probability of collision.

Also, as another example, the possibility of collision of guidance objects may be displayed to be different according to a steering wheel angle of the mobility and a moving direction of the mobility, while the mobility is driving.

Meanwhile, second guidance information 55 may be information for guiding a guidance object located in a non-overlapping region of the observation field of the image capturing apparatus and the observation field of the display of the wearable helmet, and for a guidance object located in the non-overlapping region, the apparatus 10 or 230 for providing image-based driving assistance guidance may display second guidance information in the form of a pedestrian icon in the case of a pedestrian based on guidance object type information, and may display second guidance information in a direction in which the guidance object is located in the non-overlapping region based on the guidance object position information.

That is, the apparatus 10 or 230 for providing image-based driving assistance guidance may distinguishably display guidance objects in the overlapping region and the non-overlapping region.

Also, the apparatus 10 or 230 for providing image-based driving assistance guidance may display third guidance information 54 in the form of a navigation image. Here, the third guidance information may include surrounding road conditions, traffic broadcasting, and the like. At this time, the apparatus 10 or 230 for providing image-based driving assistance guidance may receive data from a related server and generate the third guidance information 54 described above.

Referring to FIG. 11, an apparatus 10 or 230 for providing image-based driving assistance guidance may generate rear guidance information 61 or 62 to be displayed in the driver's front field of view, determine a display position of the generated rear guidance information 61 or 62, and display the rear guidance information 61 or 62 in the driver's front field of view.

Here, the rear guidance information 61 and 62 may be an image acquired by vertically flipping a rear driving image captured by a rear image capturing apparatus, and may be an image in which a guidance object is identified by an icon in the rear driving image.

In this case, the rear guidance information 61 and 62 may be displayed outside the driver's field of view. Specifically, if the rear guidance information 61 or 62 is displayed near the center of the driver's field of view, it may interfere with the driver's driving, so the apparatus 10 or 230 for providing image-based driving assistance guidance may display the guidance information 61 and 62 including a flipped rear driving image outside the center of the driver's field of view (i.e., a position away from the center of the driver's field of view in the display region of the HUD).

According to another embodiment of the present invention, the first guidance information 51, 52, and 53 may include information on objects located in the overlapping region between the observation field of the image capturing apparatus and the observation field of the display of the wearable helmet and affecting the driving of the moving object.

According to another embodiment of the present invention, the second guidance information 55 may include information on objects located in the non-overlapping region between the observation field of the image capturing apparatus and the observation field of the display of the wearable helmet and affecting the driving of the moving object According to another embodiment of the present invention, the third guidance information 54 may include information for route guidance of the moving object (e.g., navigation information, destination information, a speed of the moving object, an arrival time, route guidance information, etc.).

Also, according to an embodiment of the present invention, the first guidance information 51, 52, and 53 may be displayed in a position related to (adjacent to) positions of objects displayed on the display of the wearable helmet.

Meanwhile, according to various embodiments of the present invention, guidance information may be displayed at an optimal position in the field of view of a driver wearing a wearable helmet.

Further, according to various embodiments of the present disclosure, the driver's safety and convenience may be improved by providing guidance information on a front guide target to the field of view of the driver wearing the wearable helmet.

In addition, according to various embodiments of the present disclosure, by providing guidance information on the rear through a flipped rear image, it is possible to solve a problem that leads to a serious accident due to the driver not detecting a vehicle approaching from the rear.

Hereinabove, the present invention has been described with reference to the embodiments thereof. All embodiments and conditional illustrations disclosed in the present specification have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Therefore, the embodiments disclosed herein should be considered in an illustrative aspect rather than a restrictive aspect. The scope of the present invention is shown in the claims rather than the foregoing description, and all differences within the equivalent range should be interpreted as being included in the present invention.

Meanwhile, the method for providing image-based driving assistance guidance according to various embodiments of the present invention described above may be implemented as programs and be provided to servers or devices. Therefore, the respective apparatuses may access the servers or the devices in which the programs are stored to download the programs.

In addition, the method according to various embodiments of the present invention described above may be implemented as a program and stored in various non-transitory computer readable media and provided. The non-transitory computer readable medium is not a medium that stores data for a short time, such as a register, a cache, a memory, or the like, but means a machine readable medium that semi-permanently stores data. Specifically, various applications or programs described above may be stored and provided in the non-transitory computer readable medium, such as a compact disk (CD), a digital versatile disk (DVD), a hard disk, a Blu-ray disk, a universal serial bus (USB), a memory card, a read only memory (ROM), or the like.

Although the embodiments of the present invention have been illustrated and described hereinabove, the present invention is not limited to the specific embodiments described above, but may be variously modified by those skilled in the art to which the present invention pertains without departing from the scope and spirit of the present invention as claimed in the claims. These modifications should also be understood to fall within the technical spirit and scope of the present invention.

What is claimed is:

1. A method for providing an image-based driving assistance guidance in a wearable helmet, the method comprising:

determining whether guidance is required during a driving by a driver;

acquiring a driving image of a moving object that the driver drives;

generating guidance information for assisting the driving of the driver based on the driving image when it is determined that the guidance is required; and displaying the generated guidance information through the wearable helmet, wherein the generating of the guidance information includes detecting a guidance object from the driving image, wherein the displaying of the generated guidance information includes:

calculating a correlation value between a coordinate system of the moving object and a coordinate system of the wearable helmet; and determining a mapping position of the generated guidance information on the wearable helmet based on the calculated correlation value, and wherein the calculating of the correlation value includes selecting a calculation method based on a shape of the detected guidance object.

2. The method of claim 1, wherein the guidance includes guidance on a front of the moving object and guidance on a rear of the moving object, and the determining whether the guidance is required includes determining whether at least one of the guidance on the front and the guidance on the rear is required based on at least one of speed information of a moving object, direction indicator information of the moving object, steering operation information of the moving object, rotation direction information of the driver's head, and surrounding object information of the moving object.

3. The method of claim 1, wherein the generating of the guidance information includes flipping a rear driving image of the moving object in a vertical direction and generating guidance information including the flipped rear driving image, when it is determined that guidance on the rear is required.

4. The method of claim 3, wherein the displaying of the generated guidance information includes displaying guidance information including the flipped rear driving image outside the driver's field of view.

5. The method of claim 1, wherein the generating of the guidance information further includes:

comparing an observation view of a display of the wearable helmet with an observation view of an image capturing apparatus capturing the driving image when it is determined that guidance on the front is required; and determining an overlapping region and a non-overlapping region between the observation view of the display of the wearable helmet and the observation view of the image capturing apparatus according to a comparison result.

6. The method of claim 5, wherein the detecting the guidance object includes detecting the guidance object to be guided by distinguishing between the overlapping region and the non-overlapping region in the driving image.

7. The method of claim 6, wherein the generating of the guidance information further includes generating the guidance information based on at least one of type information of the detected guidance object, image position information of the guidance object, a distance to the guidance object, and observation field position information.

8. The method of claim 1, wherein the displaying of the generated guidance information includes:

locating the guidance information at the determined mapping position.

9. The method of claim 8, wherein the displaying of the generated guidance information includes displaying the generated guidance information at a position related to the guidance object.

10. A non-transitory computer-readable recording medium in which a program for performing a method for providing an image-based driving assistance guidance according to claim 1 is stored.

11. An apparatus for providing an image-based driving assistance guidance in a wearable helmet, the apparatus comprising:

a processor determining whether guidance is required during a driving by a driver;

the processor acquiring a driving image of a moving object that the driver drives;

the processor generating guidance information for assisting the driving of the driver based on the driving image when the guidance is required; and a head-up-display (HUD) displaying the generated guidance information through the wearable helmet, wherein the processor includes the processor that detects a guidance object from the driving image, wherein the head-up-display (HUD) is configured to calculate a correlation value between a coordinate system of the moving object and a coordinate system of the wearable helmet and to determine a mapping position of the generated guidance information on the wearable helmet based on the calculated correlation value, and wherein the head-up-display (HUD) is configured to select a calculation method of the correlation value based on a shape of the detected guidance object.

12. The apparatus of claim 11, wherein the guidance includes guidance on a front of the moving object and guidance on a rear of the moving object, and the processor determining whether the guidance is required determines whether at least one of the guidance on the front and the guidance on the rear is required based on at least one of speed information of a moving object, direction indicator information of the moving object, steering operation information of the moving object, rotation direction information of the driver's head, and surrounding object information of the moving object.

13. The apparatus of claim 11, wherein the processor generating the guidance information flips a rear driving image of the moving object in a vertical direction and generates guidance information including the flipped rear driving image, when it is determined that guidance on the rear is required.

14. The apparatus of claim 13, wherein the head-up-display (HUD) displaying the generated guidance information displays guidance information including the flipped rear driving image outside the driver's field of view.

15. The apparatus of claim 11, wherein, the processor generating the guidance information includes the processor comparing an observation view of a display of the wearable helmet with an observation view of an image capturing apparatus capturing the driving image when it is determined that guidance on the front is required and determining an overlapping region and a non-overlapping region between the observation view of the display of the wearable helmet and the observation view of the image capturing apparatus according to a comparison result.

16. The apparatus of claim 15, wherein the processor is configured to detect a guidance object to be guided by distinguishing between the overlapping region and the non-overlapping region in the driving image.

17. The apparatus of claim 16, wherein the processor generating the guidance information further includes the processor generating the guidance information based on at least one of type information of the detected guidance object, image position information of the guidance object, a distance to the guidance object, and observation field position information.

18. The apparatus of claim 11, wherein the head-up-display (HUD) displaying the generated guidance information locates the guidance information at the determined mapping position.

19. The apparatus of claim 18, wherein the head-up-display (HUD) displaying the generated guidance information displays the generated guidance information at a position related to the guidance object.

20. A wearable helmet comprising:
a glass portion located in a driver's field of view;
a processor acquiring a driving image;
the processor determining whether guidance is required during a driving by the driver;
the processor generating guidance information for assisting the driving of the driver based on a driving image when the guidance is required; and
a head-up-display (HUD) displaying the generated guidance information on the glass portion,
wherein the processor includes the processor that detects a guidance object from the driving image,
wherein the head-up-display (HUD) is configured to calculate a correlation value between a coordinate system of the moving object and a coordinate system of the wearable helmet and to determine a mapping position of the generated guidance information on the wearable helmet based on the calculated correlation value, and
wherein the head-up-display (HUD) is configured to select a calculation method of the correlation value based on a shape of the detected guidance object.

21. The wearable helmet of claim 20, wherein the driving image is an image captured by an image capturing apparatus provided in the moving object or an image captured by an image capturing apparatus provided in the wearable helmet.

* * * * *